July 23, 1935.   C. E. REED   2,009,300
ROLLER CUTTER ORGANIZATION FOR EARTH BORING DRILLS
Filed Nov. 14, 1933

Inventor:
Clarence E. Reed,
By Spear, Donaldson & Hall
Attorneys

Patented July 23, 1935

2,009,300

UNITED STATES PATENT OFFICE 2,009,300

ROLLER CUTTER ORGANIZATION FOR EARTH BORING DRILLS

Clarence E. Reed, Wichita, Kans.

Application November 14, 1933, Serial No. 697,973

12 Claims. (Cl. 255—71)

My invention relates to a roller cutter assembly of an earth boring drill and in particular to an anti-friction, non-lubricated type using preferably both roller and ball bearings, though it will be understood that the invention is not limited to the use of both types of anti-friction means.

An object of this invention is to provide a bearing race, or races, having no openings or plugged holes therein. Either a hole or a plug in a raceway seriously interferes with the operation of the cutter, particularly after it starts to wear and the interference greatly reduces the life and efficiency of the cutter.

Another object is to provide an organization capable of quick assembly or quick dismounting, and one which will be of rugged character.

Other objects will appear hereinafter.

The invention lies in the assembly and in parts constituting said assembly portion at the apex of the cone including a small diameter which will permit the insertion of a wrench or like tool for use in assembling or disassembling the organization.

Frusto-conical cutters have been commonly used with the apex end closed because of the necessity of retaining lubricant required on friction bearings, and for other reasons. This invention makes use of a frusto-conical cutter having a bore of dissimilar diameters extending completely through the cone.

In the accompanying drawing

Figure 1:
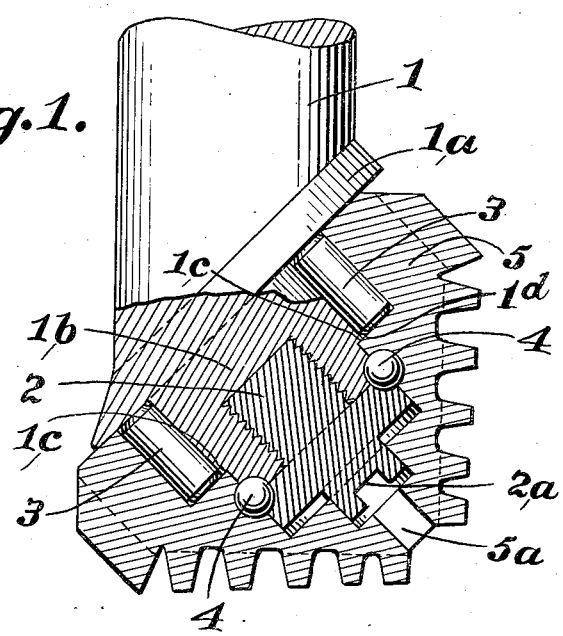
Figure 1 shows the organization in vertical section.

I is representative of a spindle support, of any suitable form, which may have any suitable means (not shown) for attachment to a bit head. *Ia* is the base plate and *Ib* is a main integral spindle portion projecting from the base plate. The end of spindle *Ib* is recessed and threaded to receive the threaded portion of member 2, which is a removable spindle portion having a recess 2a in its reduced end. This recess 2a may be square, hexagon, or other shape adapted to receive the end of a wrench for tightening the screw threads of spindle section 2 in the socket of spindle section *Ib*. It will be noted that the head portion of spindle section 2 shoulders on the end of spindle *Ib* and half of a ball race is formed in each of the parts *Ib* and 2. Roller bearings are indicated at 3 and ball bearings are indicated at 4. The cone cutter is shown at 5, and the reduced bore in the apex portion of the frusto-conical cutter is indicated at 5a. Any form of cutting teeth may be used.

The assembly is made as follows:

The spindle section 2 is placed in the cone shell 5 and the balls 4 are placed in the groove in the cone shell. The bore in the cone shell 5 is made deep enough to allow the part 2 to pass into the cone shell far enough to allow the balls to enter the groove. The rollers then may be placed in their position in the bore of the cone shell. The cone shell containing the rollers, the balls, and the spindle section 2 is now passed over the end of the spindle portion *Ib*, the threaded end of member 2 starting to enter the recess in the end of spindle section *Ib*. A suitable wrench, not shown, is inserted into the recess 2a and turning the wrench will complete the assembly by tightening the threaded portion of spindle section 2 in the threaded recess of part *Ib*. These threads are right hand, viewed from the apex of the cone, and as the cone rotates in operation, the tendency of all frictions from rotation are to tighten the threads. Clearance is shown opposite the threaded end of 2 in the recess or bore of the cutter shell. Spindle terminal portion or section 2 shoulders against the end of *Ib*. When thus screwed into assembled positions the balls are held in a race, the upper part of which is in the cone shell, and the lower part is formed by the meeting portions *Ib* and 2 of the spindle. It will be obvious that a race thus formed has no openings or plugs therein. The tendency of all frusto-conical cutters is to rock on their bearings, particularly the relatively short bearings in general use, and this rocking of the cone shell weaves the teeth back and forth on the rock in such manner as to grind them off without an effective penetration action. The bearing of the form of this invention is unusually long and holds the cone shell steady and firmly in the desired position. Long roller bearings may be used on the large diameter of the spindle and the reduced end of the spindle portion 2 acts to center and support the apex portion, which, however, is mainly carried by the base portion of the cone on the large part of the bearing, the main portion of the cutting area of the cone being directly over the rollers and balls on the large diameter portion of the spindle. It will be observed that the cone shell has a bearing on the main spindle at both sides of the balls, viewed in section, and these portions of the cone help steady it.

It will be noted that the space between the threaded stem of the terminal section 2 of the spindle and the wall of the cutter is large enough to allow the balls to pass into their raceway in the cutter.

The invention is not limited to frusto-conical cutters but may be used with any form of roller cutter. The invention is applicable in particular to any form of roller cutter assembly presenting the problem of mounting anti-friction type bearings, or a retaining means, within the bore of the cutter without the use of threaded rings secured to the cutter, or use of holes or plugs or both in the raceway or raceways, or in the groove for the retaining means.

While in Fig. 1 a recess 2a is shown with access to the recess through a bore in the apex of the conical cutter, it will be apparent that if desired for any reason the recess 2a could be placed in the threaded stem portion of the removable free end of the spindle, and access to said recess so placed for manipulation of the part in assembly could be had through a hole in the base of the spindle on the axis thereof extending in from the outside of the spindle support.

Figure 2:
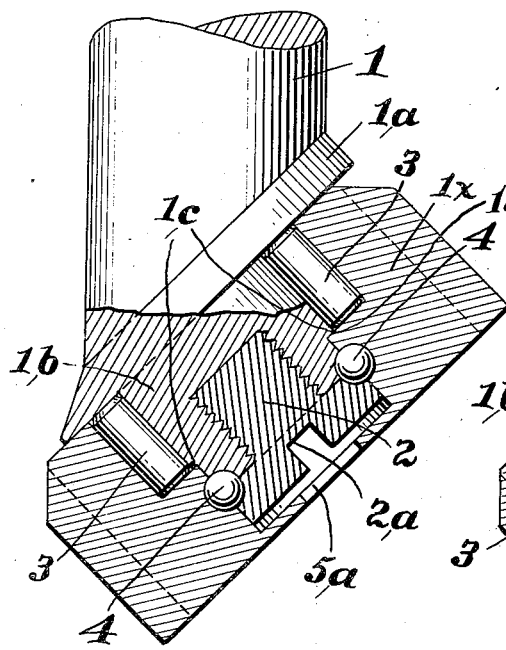
Figs. 2 and 3 are views of modified forms of cylindrical cutters embodying my improvements.
Figure 3:
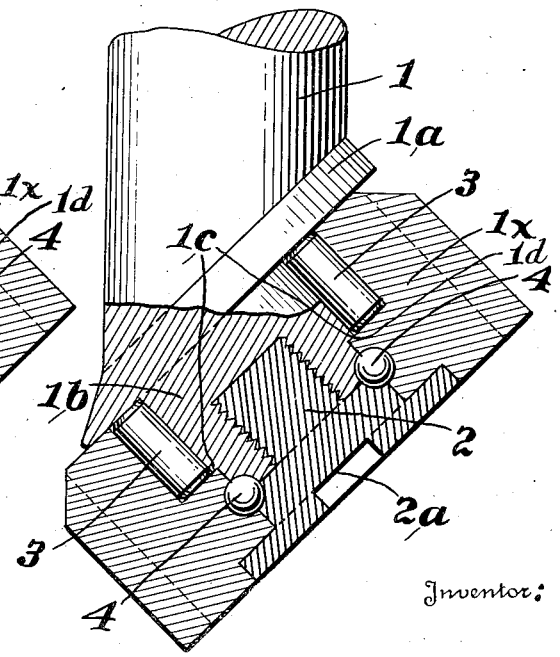

In Figs. 2 and 3 parts which correspond substantially to those described in connection with the conical roller cutter assembly are designated by similar reference characters.

The roller cutter in these views are of general cylindrical form and are designated by the reference character 1x.

In all the figures there is shown at 1c a shoulder on the main part of the spindle which presents a bearing surface extending in a plane at right angles to the axis of the spindle. This takes the end thrust of the roller cutter which is provided with a complementary bearing surface, or shoulder, thus relieving the anti-friction bearings of this end thrust. This shoulder, or end thrust surface, on the wall of the bore of the cutter, which is complemental to the shoulder 1c on the spindle, is an inward continuation of the shoulder at the inner end of the raceway of the cutter for the cylindrical roller bearings. This latter shoulder is designated 1d. This shoulder 1d is the lateral face of a portion of the cutter body lying between the ball raceway and the roller bearing raceway of the cutter.

The provision of a flange on the spindle section 2 larger than the diameter of the main spindle section and overlapping a surface of the cutter, as shown in Fig. 3, constitutes subject matter of a copending application Serial No. 701,115, filed December 6, 1933.

I claim:

1. A roller cutting organization having anti-friction means and comprising a roller cutter, a spindle composed of a main and a detachable terminal section, each having a complementary portion of a raceway, said terminal section being adapted to be initially positioned in the bore of the cutter, with its raceway out of registry with a raceway in the wall of the cutter bore for the introduction of the said anti-friction means into the raceway of the cutter before the main spindle section is placed in the bore of the cutter, said spindle sections when attached together completing a raceway in registry with the raceway in the wall of the cutter bore.

2. A toothed conical roller cutter assembly for earth boring drills comprising a spindle in sections, one of which is the terminal portion which is connected to the other, a frusto-conical cutter having a bore receiving said spindle sections, anti-friction bearings within the cutter and between the same and the spindle sections within the cutter, said cutter having an opening in its apex portion through which access may be had to the terminal section of the spindle for its attachment to the other spindle section, said terminal section when in connection with said other spindle section holding the parts of the assembly together for operation, substantially as described.

3. A rotary cutter organization according to claim 2 in which, in addition to the anti-friction means mentioned, anti-friction bearing members are arranged between the roller cutter and the main spindle section.

4. A roller cutter assembly for earth boring drills comprising a spindle having a detachable part, a toothed rotary conical cutter, anti-friction bearings between the roller cutter and spindle means within the same locking the cutter on the spindle rotatively, and held in working position by said detachable part, said cutter having an axial opening in its apex for the introduction of a tool for removing the detachable part, substantially as described.

5. In combination in an earth boring roller cutter assembly, a spindle having at its end portion part of a raceway for anti-friction bearings, a section detachably connected with the end of the spindle and having another part of said raceway, and a conical roller cutter having a bore within which the spindle and its detachable section are located, said cutter having another part of said raceway and having also an opening at its apex portion for gaining access to the detachable section for its removal.

6. A conical roller cutter organization for earth boring drills comprising a spindle in sections end to end, a conical roller cutter having a bore within which the sectional spindle lies, that section of the spindle nearest the apex of the cutter being attached to the other section, said roller cutter having an opening through its apex portion for gaining access to the spindle for the attachment of its end section, said sections and the wall of the bore of the cutter having each a portion of a raceway, and anti-friction bearings in said raceway, the walls of each of said raceway portions being uninterrupted throughout their circuit, said conical cutter being locked rotatively on the spindle by said anti-friction bearings.

7. A roller cutter organization according to claim 5 in which anti-friction bearings are interposed between the side of said spindle and a wall of the cutter bore at the open base portion of the conical cutter, substantially as described.

8. A roller cutter organization for earth boring drills having a spindle, a conical roller cutter thereon, said spindle comprising a main section and a terminal detachable section having a screw threaded connection between them, said terminal section having a part of a raceway for anti-friction bearings, a conical toothed roller cutter having a bore within which the spindle and its detachable section lie, and having an opening at its apex portion, means on the detachable section in line with said opening through which the detachable section may be engaged by a suitable tool for removal of the detachable section, said roller cutter and said main part of the spindle having raceway portions complementary to that of the detachable section, substantially as described.

9. In combination in a roller cutter organization for earth boring drills, a main spindle portion having part of a raceway and a base plate, a detachable spindle section at the end of the main spindle portion, said detachable section having a terminal reduced portion, another portion having screw threaded connection with the main section, and a third portion forming a part of a raceway adjacent to said part of a raceway on the main spindle portion, a conical roller cutter having a bore within which the spindle sections are located, one part of said bore being reduced to fit the reduced terminal portion of the detachable spindle section, and another part of said bore having a raceway portion complementary to the raceway portions in the main and detachable sections of the spindle, and anti-friction bearings fitted to said raceways, said reduced portion of the detachable spindle section having means to receive a wrench, and said conical cutter having an opening in its apex portion through which the wrench may be introduced.

10. A roller cutter organization for earth boring drills comprising a spindle, a conical roller cutter having a bore within which the spindle lies, means within the cutter including a detachable flange for locking the said roller cutter rotatively on the spindle, said conical roller cutter having an opening in its apex portion, through which access may be had to the flange for the removal of the cutter from the spindle.

11. A cutter having a bore opening at one side receiving a spindle having a free end which end is separate and removable from the base end of the said spindle, and which, when in place, holds locking means which retains the cutter rotatively on the spindle, said cutter having an opening through which access may be had for manipulating the removable free end of the spindle.

12. A roller cutter having a bore opening at one side for receiving a spindle having a free end, which end is separate and removable from the base end of the said spindle, said removable end, when in place, holding means which retains the cutter rotatively on the spindle, said cutter having clearance in the end of the bore permitting the assembly within the cutter of the free end of the spindle and the retaining means into operating position.

CLARENCE E. REED.